(12) United States Patent
Syed et al.

(10) Patent No.: US 12,241,425 B2
(45) Date of Patent: Mar. 4, 2025

(54) HYBRID ELECTRIC PROPULSION SYSTEM WITH START SEQUENCE AND SHUTDOWN SEQUENCE

(71) Applicant: Pratt & Whitney Canada Corp., Longueuil (CA)

(72) Inventors: Yusuf Syed, Oakville (CA); Thomas Trevor Ricci, Kirkland (CA); James Jarvo, Long Sault (CA)

(73) Assignee: Pratt & Whitney Canada Corp., Longueuil (CA)

(*) Notice: Subject to any disclaimer, the term of this patent is extended or adjusted under 35 U.S.C. 154(b) by 0 days.

(21) Appl. No.: 18/436,826

(22) Filed: Feb. 8, 2024

(65) Prior Publication Data

US 2024/0271577 A1   Aug. 15, 2024

Related U.S. Application Data

(60) Provisional application No. 63/445,179, filed on Feb. 13, 2023.

(51) Int. Cl.
| | |
|---|---|
| *F02C 9/58* | (2006.01) |
| *B64C 11/38* | (2006.01) |
| *F01D 15/10* | (2006.01) |
| *F01D 15/12* | (2006.01) |
| *F01D 25/18* | (2006.01) |
| *F02C 7/32* | (2006.01) |

(52) U.S. Cl.
CPC .............. *F02C 9/58* (2013.01); *B64C 11/385* (2013.01); *F01D 15/10* (2013.01); *F01D 15/12* (2013.01); *F01D 25/18* (2013.01); *F02C 7/32* (2013.01)

(58) Field of Classification Search
CPC ......... F02C 9/58; B64D 31/18; B64D 35/022; B64D 27/026; B64D 27/33; F02K 1/66
See application file for complete search history.

(56) References Cited

U.S. PATENT DOCUMENTS

| | | |
|---|---|---|
| 9,446,842 B2 | 9/2016 | Luyks |
| 9,932,120 B2 | 4/2018 | Fisher |
| 10,336,461 B2 | 7/2019 | Mackin |
| 10,450,080 B1 * | 10/2019 | Beach .................... B64D 27/24 |
| 11,542,872 B2 | 1/2023 | Terwilliger |
| 11,649,038 B2 | 5/2023 | Mark |

(Continued)

OTHER PUBLICATIONS

EP Search Report for EP Patent Application No. 24156947.4 dated Jun. 28, 2024.

*Primary Examiner* — Gerald L Sung
(74) *Attorney, Agent, or Firm* — Getz Balich LLC

(57) ABSTRACT

A method of and system for operating a hybrid electric propulsion system for an aircraft in a start sequence is provided. The hybrid electric propulsion system includes a thermal engine, an electric motor, a gearbox, an electric power storage unit, and a propulsion unit having a propeller having propeller blades. The method includes: driving the propeller from a static state to a target rotational speed within a predetermined range of speeds using the electric motor; transitioning the propeller blades from a feathered mode to an unfeathered mode while the propeller is being driven at the target rotational speed solely by the electric motor; starting the thermal engine; and transitioning the driving of the propeller using the electric motor to driving the propeller using the thermal engine.

16 Claims, 6 Drawing Sheets

(56) References Cited

U.S. PATENT DOCUMENTS

| | | | |
|---|---|---|---|
| 2013/0000314 A1* | 1/2013 | McCaffrey | F01D 13/003 |
| | | | 60/773 |
| 2016/0340051 A1 | 11/2016 | Edwards | |
| 2017/0211474 A1* | 7/2017 | Sennoun | F02K 3/06 |
| 2018/0372003 A1 | 12/2018 | Hon | |
| 2019/0001955 A1 | 1/2019 | Gansler | |
| 2022/0009615 A1* | 1/2022 | Mark | B60L 3/0061 |
| 2023/0021937 A1 | 1/2023 | Detweiler | |
| 2023/0250766 A1* | 8/2023 | Des Roches-Dionne | B64C 11/34 |
| | | | 416/27 |

* cited by examiner

HYBRID ELECTRIC PROPULSION SYSTEM WITH START SEQUENCE AND SHUTDOWN SEQUENCE

This application claims priority to U.S. Patent Appln. No. 63/445,179 filed Feb. 13, 2023, which is hereby incorporated herein by reference in its entirety.

BACKGROUND OF THE INVENTION

1. Technical Field

The present disclosure relates to hybrid-electric aircraft propulsion systems and methods for operating the same.

2. Background Information

In a typical regional turboprop application, the thermal engine is started with the propeller feathered. Once the thermal engine has achieved an idle status, the thermal engine is run at ground idle or flight idle with the propeller blades feathered. The term "feathered" refers to the pitch angle of a propeller blade relative to the plane of rotation of the propeller. The blade pitch angle known as "feather" describes the pitch angle wherein the propeller blades are substantially leading edge-on to the forward direction of travel. A "flat" pitch angle refers to a pitch angle that is about zero degrees; i.e., the propeller blades present an essentially flat face to the direction of travel; e.g., see FIG. 1. A variable pitch propeller may be configured to permit pitch control of the propeller blades in a pitch range defined between a feathered configuration and a flat pitch configuration.

In the operation of a turboprop engine, there is normally a predetermined acceptable range of propeller rotational speeds ("placard speed range") and a predetermined torque limit that can be applied to the propeller. The propeller placard speed range and torque limit must be respected during operation of the turboprop engine.

Some currently available hybrid-electric propulsion systems having a direct drive between the propeller and the thermal engine/eMotor and the propulsion unit use the eMotor to crank the thermal engine and assist with the starting process until the thermal engine is self-sustaining and able to accelerate to idle. If the engine idle speed of the thermal engine is high, however, this may result in a propeller torque that encroaches upon the propeller torque limit in feather.

What is needed is a system and method that can be used by a hybrid-electric propulsion system that coordinates operation of the electric motor and the thermal engine in a manner that respects the propeller placard speed range.

SUMMARY

According to an aspect of the present disclosure, a method of operating a hybrid electric propulsion system for an aircraft in a start sequence is provided. The hybrid electric propulsion system includes a thermal engine, an electric motor, a gearbox, an electric power storage unit, and a propulsion unit having a propeller having propeller blades. The method includes: driving the propeller from a static state to a target rotational speed within a predetermined range of speeds using the electric motor; transitioning the propeller blades from a feathered mode to an unfeathered mode while the propeller is being driven at the target rotational speed solely by the electric motor; starting the thermal engine; and transitioning the driving of the propeller using the electric motor to driving the propeller using the thermal engine.

In any of the aspects or embodiments described above and herein, the transitioning the driving of the propeller to driving the propeller using the thermal engine may include terminating using the electric motor and solely using the thermal engine to drive the propeller.

In any of the aspects or embodiments described above and herein, during the transitioning the driving of the propeller using the electric motor to driving the propeller using the thermal engine, a first drive contribution of the electric motor may be decreased and a second drive contribution of the thermal engine may be increased.

In any of the aspects or embodiments described above and herein, during the transitioning the driving of the propeller, the first drive contribution of the electric motor may be decreased to a zero contribution and the second drive contribution of the thermal engine may be increased to the thermal engine solely driving the propeller.

In any of the aspects or embodiments described above and herein, the propulsion unit may include a hydromechanical pitch change mechanism.

In any of the aspects or embodiments described above and herein, during the driving of the propeller at the target rotational speed using the electric motor, the system may be configured so that the electric motor drives an engine oil system of the thermal engine to produce a flow of engine oil adequate for the hydromechanical pitch change mechanism to control a pitch of the propeller blades.

In any of the aspects or embodiments described above and herein, the electric motor may be powered using electrical power from the electric power storage unit.

In any of the aspects or embodiments described above and herein, the electric motor may be powered using an external electric power source.

In any of the aspects or embodiments described above and herein, the method may further include controlling the electric motor to control a rate of unfeathering of the propeller, and may include controlling the electric motor as a function of a torque and/or a rate of change of torque applied by the electric motor to the propeller.

According to an aspect of the present disclosure, a hybrid electric propulsion system for an aircraft is provided that includes a thermal engine, an electric motor, a gearbox, an electric power storage unit, a propulsion unit, and a controller. The gearbox is in communication with the thermal engine and the electric motor. The propulsion unit includes a propeller having propeller blades. The controller is in communication with the thermal engine, the electric motor, the propulsion unit, and a memory storing instructions. The instructions when executed cause the controller to perform a plurality of actions during a start sequence of the system, the actions including: control the electric motor to drive the propeller from a static state to a target rotational speed within a predetermined range of speeds; control the propulsion unit to transition the propeller blades from a feathered mode to an unfeathered mode while the propeller is being driven at the target rotational speed solely by the electric motor; control the thermal engine to start operation; and control the electric motor and the thermal engine to transition the driving of the propeller using the electric motor to driving the propeller using the thermal engine.

In any of the aspects or embodiments described above and herein, the instructions when executed may cause the controller to decrease a first drive contribution of the electric motor to a zero contribution and increase a second drive contribution of the thermal engine until the thermal engine is solely driving the propeller.

In any of the aspects or embodiments described above and herein, when the electric motor is controlled to drive the propeller from the static state to the target rotational speed using the electric motor, the system may be configured so that the electric motor drives an engine oil system of the thermal engine to produce a flow of engine oil adequate for the hydromechanical pitch change mechanism to control a pitch of the propeller blades.

In any of the aspects or embodiments described above and herein, the instructions when executed may cause the controller to control the electric motor to control a rate of unfeathering of the propeller, including controlling the electric motor as a function of a torque and/or a rate of change of torque applied by the electric motor to the propeller.

According to an aspect of the present disclosure, a method of operating a hybrid electric propulsion system for an aircraft is provided. The hybrid electric propulsion system includes a thermal engine, an electric motor, a gearbox, an electric power storage unit, and a propulsion unit having a propeller having propeller blades. The method includes: initially driving the propeller using the thermal engine while the aircraft is on ground; transitioning the driving of the propeller using the thermal engine to driving the propeller using the electric motor; terminating operation of the thermal engine; transitioning the propeller blades from an unfeathered mode to a feathered mode while the propeller is being driven solely by the electric motor; driving the propeller in the feathered mode for a period of time sufficient to permit engine oil utilized in the propulsion unit to be scavenged out of the propulsion unit; and shutting down the propulsion system.

In any of the aspects or embodiments described above and herein, the aircraft is stationary and the transitioning the driving of the propeller using the thermal engine to driving the propeller using the electric motor and the terminating operation of the thermal engine may be performed while the hybrid electric propulsion system is in a shutdown mode.

In any of the aspects or embodiments described above and herein, during the transitioning the propeller blades from the unfeathered mode to the feathered mode while the propeller is being driven solely by the electric motor, the electric motor may be controlled to drive an engine oil system of the thermal engine to produce a flow of engine oil adequate for the propulsion unit to control a pitch of the propeller blades.

In any of the aspects or embodiments described above and herein, the transitioning the driving of the propeller using the thermal engine to driving the propeller using the electric motor and the terminating operation of the thermal engine may be performed while the hybrid electric propulsion system is provided propulsion power to the aircraft.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 2:
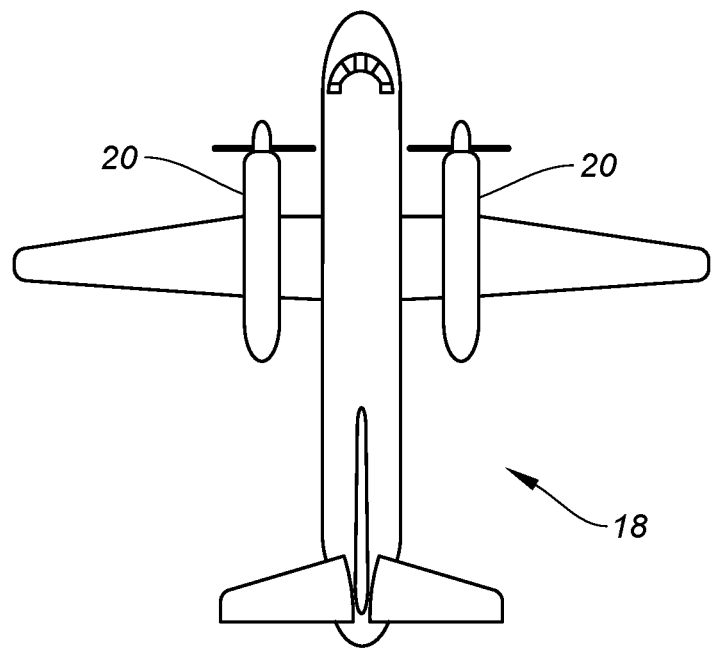
FIG. 2 is a diagrammatic representation of an aircraft that includes present disclosure HEP systems

Referring to FIG. 2, aspects of the present disclosure system are directed to an aircraft 18 that includes one or more hybrid electric propulsion (HEP) system 20. FIG. 2 illustrates a manned fixed wing aircraft having a pair of HEP systems 20. The present disclosure is not limited to this aircraft example, and is applicable to other aircraft including unmanned fixed wing aircraft, manned rotary aircraft, unmanned rotary aircraft, and the like.

Figure 3:
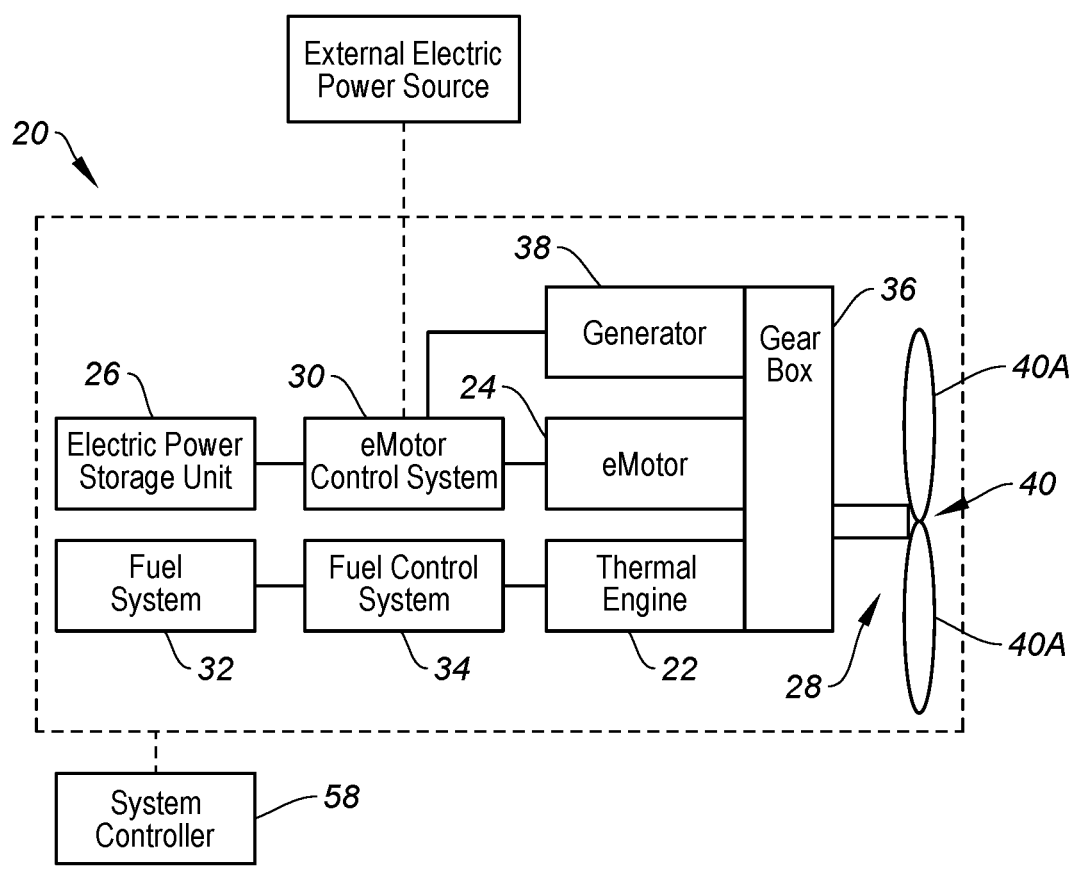
FIG. 3 is a diagrammatic representation of a present disclosure HEP system in a parallel configuration.
Figure 4:
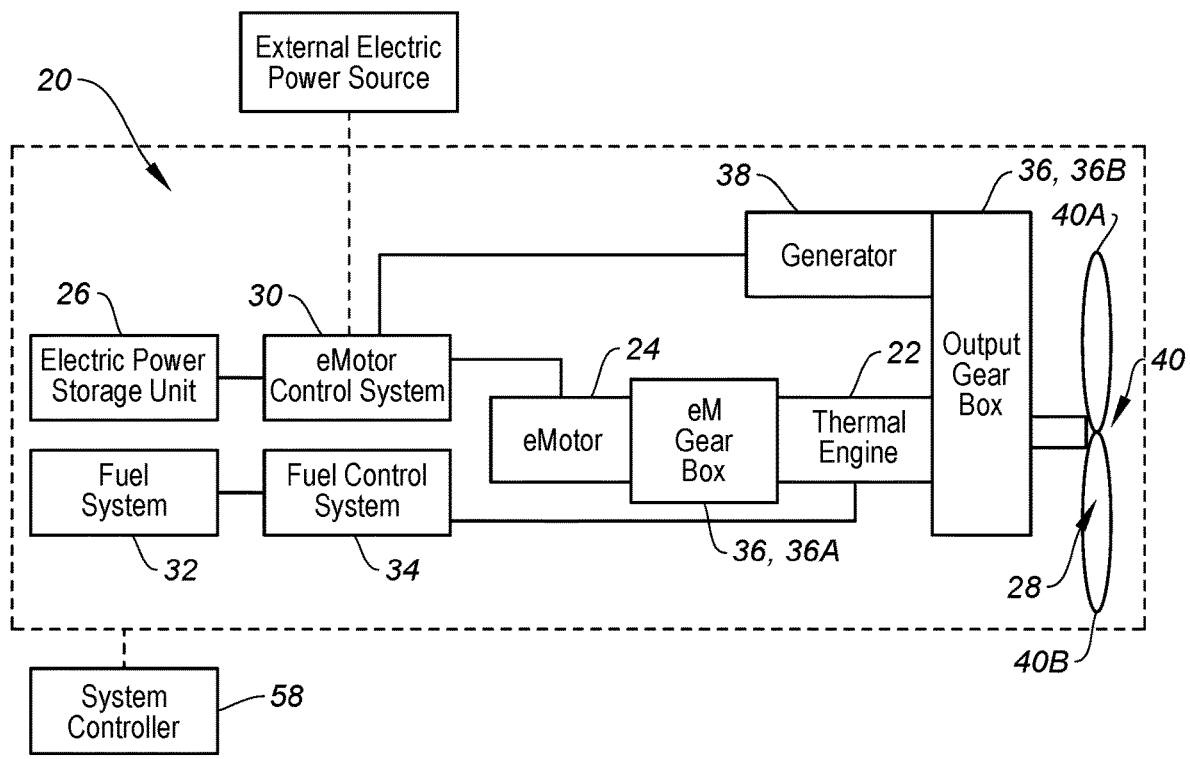
FIG. 4 is a diagrammatic representation of a present disclosure HEP system in a series configuration.

FIGS. 3 and 4 diagrammatically illustrate present disclosure HEP system 20 embodiments that include a thermal engine 22, an electric motor 24 ("eMotor 24"), an electric power storage unit 26, and a propulsion unit 28. These HEP system 20 embodiments may include an electric motor control system ("eMotor control system 30"), a fuel system 32, a fuel control system 34, and one or more gearboxes 36, as well as other components. As described herein, present disclosure system embodiments may also include an electric generator 38.

To facilitate the description herein, the present disclosure HEP system 20 is described as a singular system that can be used to power an aircraft. In some embodiments, more than one present disclosure HEP system 20 may be used to power an aircraft; e.g., a twin engine aircraft like that shown in FIG. 2.

Figure 5:
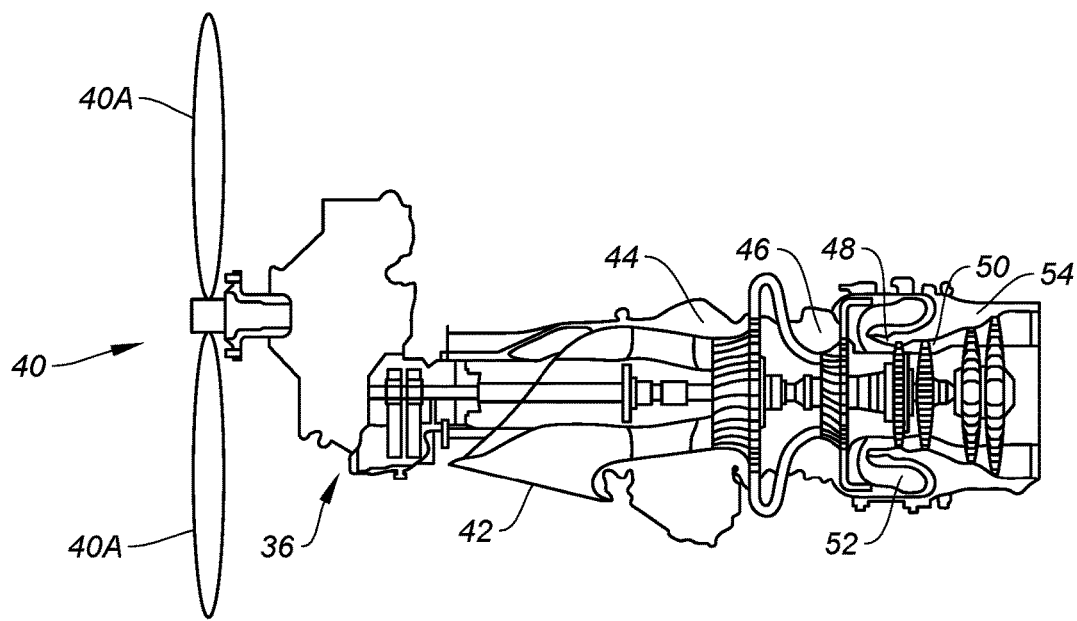
FIG. 5 is a diagrammatic sectional view of an exemplary gas turbine engine.

The term "thermal engine" as used herein includes various types of gas turbine engines, internal combustion engines, and the like that combust traditional aviation fuels and/or sustainable aviation fuels (SAFs), or the like. FIG. 5 is a diagrammatic cross-sectional view of gas turbine engine that includes a propeller 40, a reduction gearbox 36, an inlet duct 42, a low pressure compressor 44, a high pressure compressor 46, a high pressure turbine 48, a low pressure turbine 50, and a combustor 52. In some instances, the thermal engine 22 may include one or more power turbines 54. The gas turbine engine shown in FIG. 5 is a nonlimiting example of a thermal engine 22. Present disclosure HEP systems 20 may include other gas turbine engine configurations, or the thermal engine 22 may be a piston engine or a rotary engine.

Referring back to FIGS. 3 and 4, the eMotor 24 may be an alternating current (AC) motor configured to rotationally drive a component. For example, the eMotor 24 may be configured to rotationally drive at least a portion of a gearbox 36 (e.g., see FIG. 3), or may be configured to provide rotational drive to a thermal engine 22 (e.g., see FIG. 4), or the like.

The propulsion unit 28 is a driven device that is configured to selectively produce thrust that can be used to power an aircraft. The propulsion unit 28 as described herein includes a propeller 40 that has propeller blades 40A and a mechanism for adjusting the pitch of the propeller blades 40A (sometimes referred to as a "pitch change mechanism 56"—see FIG. 6). Hydro-mechanical pitch change mechanisms 56 are known in the art, and the present disclosure is not limited to any particular type of hydro-mechanical pitch change mechanism 56 for adjusting propeller pitch. The present disclosure is not limited to use with a propulsion unit 28 that includes propeller blades 40A.

The electric power storage unit 26 is configured to selectively store electrical energy in a first operational mode (i.e., a charging mode), and to produce electrical energy in a second operational mode (i.e., a discharging mode). An example of an electric power storage unit 26 is one that includes one or more batteries. Electric power storage devices other than batteries may be used in some embodiments.

The eMotor control system 30 may include hardware and controls for providing electrical power to the eMotor 24. In those embodiments wherein the electric power storage unit 26 provides the electrical power used to power the eMotor 24, the eMotor control system 30 may include an inverter configured to manage electrical power from the electric power storage unit 26. In some embodiments, the eMotor control system 30 is configured to operate the eMotor 24 in an electric motor mode wherein the eMotor 24 produces rotational shaft power. In some embodiments, the eMotor control system 30 may be configured to selectively operate the eMotor 24 in a generator mode wherein the eMotor 24 produces electrical power. In the generator mode, the eMotor control system 30 may be configured to manage the generator produced electrical power to the electric power storage unit 26 for recharging purposes. In some embodiments, the eMotor control system 30 may be configured to manage the performance of the electric power storage unit 26. In some embodiments, the present disclosure may utilize a battery management system that is independent of and in communication with the eMotor control system.

The fuel system 32 may include a fuel reservoir and one or more fuel pumps for pumping the fuel to the thermal engine 22.

The fuel control system 34 may include an electronic controller such as a FADEC or may include a mechanical controller, or any combination thereof. The fuel control system may be configured as an "engine control unit" that controls fuel flow to the thermal engine 22 as well as other functionalities associated with controlling the operation of the thermal engine. The present disclosure is not limited to any particular type of fuel control system 34 or engine control system other than one that is configured to perform the functionality described herein.

The gearbox 36 may assume different configurations. The term "gearbox" as used herein may refer to a reduction gearbox that is configured to accept an input rotational drive at a first rotational drive speed (S1) and at a first torque (T1) and produce an output rotational drive at a second rotational drive speed (S2) and at a second torque (T2), wherein the first rotational drive speed is greater than the second rotational drive speed (S1>S2) and the second torque is greater than the first torque (T2>T1). The present disclosure is not limited to any particular type of gearbox 36. In a first configuration, a gearbox 36 may be driven by the thermal engine 22, or by the eMotor 24, or a combination thereof; e.g., a parallel configuration as diagrammatically shown in FIG. 3. In a second configuration (e.g., a series configuration as diagrammatically shown in FIG. 4), an eMotor 24 may be in drive communication with a first gearbox (i.e., "eMotor gearbox 36A") and that first gearbox 36A may be in drive communication with a thermal engine 22. The thermal engine 22, in turn, may be in drive communication with a second gearbox (i.e., "output gearbox 36B") and that second gearbox 36B may be in drive communication with a propulsion unit 28. The present disclosure is not limited to the configurations diagrammatically shown in FIGS. 3 and 4. In some embodiments, the HEP system 20 may be configured to permit selective decoupling between the thermal engine 22 and the gearbox 36, 36B.

The term "controller" as used herein refers to a device that may include any type of computing device, computational circuit, processor(s), CPU, computer, or the like capable of executing a series of instructions that are stored in memory. The instructions may include an operating system, and/or executable software modules such as program files, system data, buffers, drivers, utilities, and the like. The executable instructions may apply to any functionality described herein to enable the HEP system 20 (or a system component) to accomplish the same algorithmically and/or coordination of system components. A controller may include or may be in communication with one or more memory devices. The present disclosure is not limited to any particular type of memory device, and the memory device may store instructions and/or data in a non-transitory manner. Examples of memory devices that may be used include read-only memory, random access memory, volatile memory, non-volatile memory, static memory, dynamic memory, flash memory, cache memory, and/or any device that stores digital information. A controller may include, or may be in communication with, an input device that enables a user to enter data and/or instructions, and may include, or be in communication with, an output device configured, for example to display information (e.g., a visual display or a printer), or to transfer data, etc. Communications between a controller and other system components may be via a hardwire connection or via a wireless connection.

Some present disclosure HEP system 20 embodiments have integrated system components. A system controller 58 may be utilized to control those system components and to perform the functionality described herein. In some embodiments the eMotor control system 30 may be integral with a system controller 58. In other system embodiments, one or more system components may include a dedicated controller for the respective component and that respective component controller is in communication with a system controller 58. For example, in some embodiments the eMotor control system 30 may include a controller and may be independent of and in communication with a system controller 58. In other system embodiments, component controllers may be in communication with one another and collectively configured as a system controller. FIGS. 3 and 4 diagrammatically illustrate the HEP system 20 having an independent system controller 58 to facilitate the description herein. The present disclosure HEP system 20 is not limited to having an independent system controller 58, and in fact is not limited to any particular controller architecture unless specifically stated herein.

Implementation of the techniques, blocks, steps, and means described herein may be done in various ways. For example, these techniques, blocks, steps, and means may be implemented in hardware, software, or a combination thereof. For a hardware implementation, processing devices configured to carry out the described functions and steps (e.g., by executing stored instructions) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or other electronic units designed to perform the functions described herein, and/or any combination thereof.

Embodiments of the present disclosure may be described herein as a process which is depicted as a flowchart, a flow diagram, a block diagram, etc. Although any one of these structures may describe the operations as a sequential process, many of the operations can be performed in parallel and/or concurrently. In addition, the order of the operations may be rearranged. A process may correspond to a method, a function, a procedure, a subroutine, a subprogram, etc.

In the system embodiment shown in FIG. 3, the eMotor control system 30 is in communication with the eMotor 24 and with the electric power storage unit 26. The eMotor control system 30 may be configured to provide electrical power (e.g., originating from the electric power storage unit 26, or from a generator 38, or other electrical power source) to the eMotor 24 and may be configured to control operation of the eMotor 24 (e.g., via stored instructions). The fuel control system 34 is in communication with the thermal engine 22 and the fuel system 32 and may be configured (e.g., via stored instructions) to control the thermal engine 22 and the fuel system 32. In this embodiment, the eMotor 24 and the thermal engine 22 are both in drive communication with the gearbox 36 in a parallel configuration as mechanical power inputs into the gearbox 36. The propulsion unit 28 is in drive communication with an output of the gearbox 36 and is therefore driven by the gearbox 36 output when the HEP system 20 is operating in a normal mode.

In the embodiment shown in FIG. 4, the eMotor control system 30 is in communication with the eMotor 24, the electric power storage unit 26, and the generator 38 (if included). The eMotor control system 30 may be configured to provide electrical power from the electric power storage unit 26 (or from a generator 38) to the eMotor 24 in a form acceptable to the eMotor 24 and to control operation of the eMotor 24 (e.g., via stored instructions). The fuel control system 34 is in communication with the thermal engine 22 and the fuel system 32 and may be configured (e.g., via stored instructions) to control the thermal engine 22 and the fuel system 32. In this embodiment, the eMotor 24 is in drive communication an eM gearbox 36A, the eM gearbox 36A is in drive communication with the thermal engine 22, and the thermal engine 22 is in drive communication with the output gearbox 36B. The output gearbox 36B, in turn, is in drive communication with the propulsion unit 28. Hence, the eMotor 24, eM gearbox 36A, the thermal engine 22, the output gearbox 36B, and the propulsion unit 28 are disposed in a series configuration.

In those present disclosure HEP system 20 embodiments that include an optional electric generator (independent of the eMotor 24), the electrical power produced by the optional electric generator when the HEP system 20 is operating in a normal mode may be used for electrical demands within the aircraft and/or may be used to provide electrical power to the eMotor 24 under operating scenarios wherein the eMotor 24 is operating as an electric motor providing propulsive power in combination with the thermal engine 22.

Figure 1:
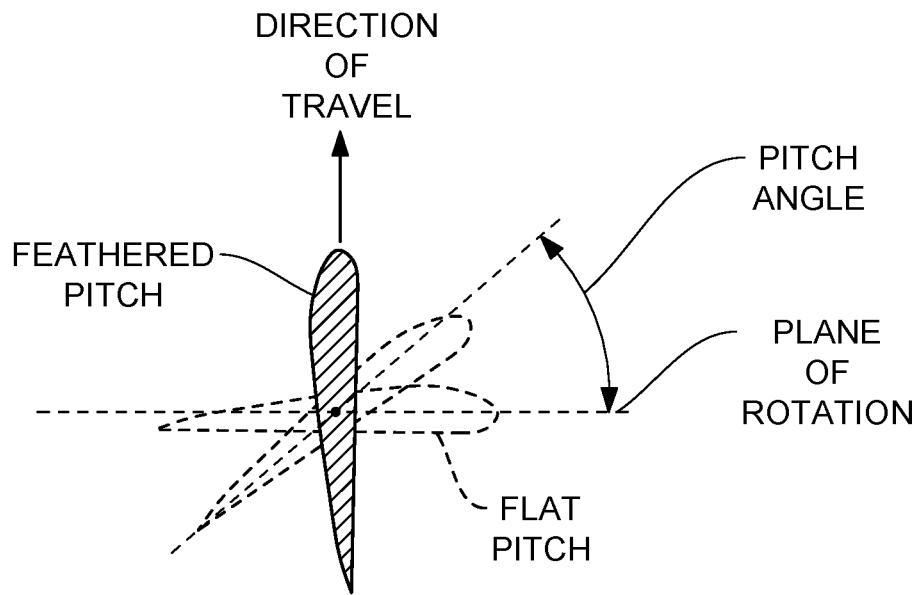
FIG. 1 is a diagram of propeller pitch relative to direction of travel and propeller plane of rotation.
Figure 6:
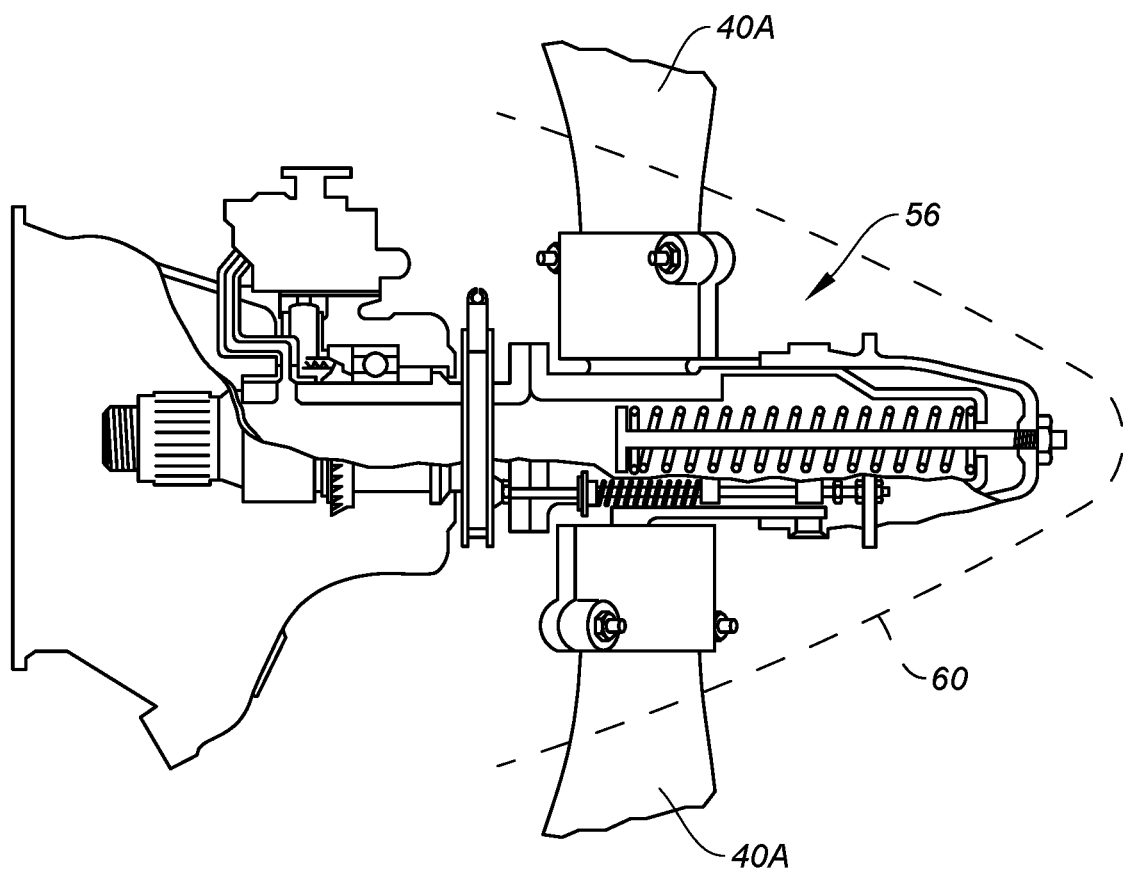
FIG. 6 is a diagrammatic representation of a propulsion unit with a pitch change mechanism.

Many aircraft propulsion systems utilize a hydro-mechanical pitch change mechanism 56 to selectively vary the pitch of the propeller blades 40A. FIG. 6 diagrammatically illustrates a nonlimiting example of a pitch change mechanism 56 enclosed by the spinner 60 of a propulsion unit 28. The pitch of a propeller blade 40A can be varied by rotating the propeller blade 40A about the longitudinal axis of the propeller blade 40A. Varying the pitch of the propeller blades 40A (i.e., the angle of the blades 40A relative to the propeller's plane of rotation—see FIG. 1) enables the operator to vary the amount of torque required to rotate the propeller 40. In this manner, the pitch change mechanism 56 can be used to achieve preferred operating parameters.

As indicated above, some hybrid electric propulsion systems use an electric motor to crank the thermal engine (e.g., via a gearbox) during a HEP starting procedure until the thermal engine is operating in a self-sustaining mode and is able to accelerate to an idle speed. During this start up procedure up to and including the thermal engine at idle speed, the propeller is feathered. The idle speed is selected at a value that is high enough to permit accessories (e.g., electrical AC generator, hydraulic system, and the like) to be brought on line. An issue with this HEP configuration is that the idle speed of the thermal engine necessary to bring the accessories on line may be associated with a propeller speed (NP) that is close to or at the upper end of the propeller placard speed range. The present disclosure provides a system and method that avoids this limitation.

Figure 7:
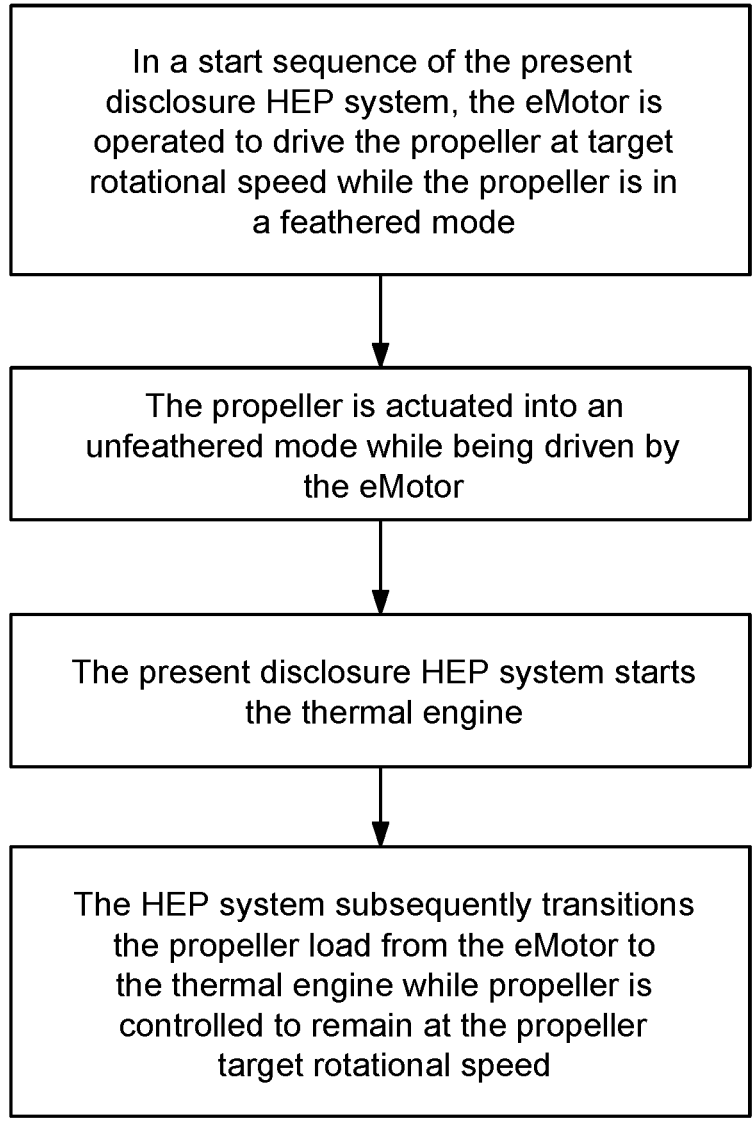
FIG. 7 is a flow chart of an embodiment of a present disclosure system operation.

Referring to FIG. 7, embodiments of the present disclosure include a HEP system 20 start sequence that utilizes the eMotor 24 to drive the propeller 40 (without assistance from the thermal engine 22) from a static state (i.e., propeller 40 not revolving) to an appropriate speed (a "target rotational speed") within the propeller placard speed range. During this phase of the HEP system 20 start sequence, the eMotor 24 may be powered by an external source of electric power ("AC ground power") or by the electric power storage unit 26. In some embodiments, the HEP system 20 may be configured such that the eMotor 24 may be used to drive an engine oil system of the thermal engine 22 prior to the thermal engine 22 starting in a manner that produces a flow of engine oil sufficient for the hydromechanical pitch change mechanism 56 to be operable to control the pitch of the propeller blades 40A; e.g., feather/unfeather. The present disclosure HEP system 20 may be configured to subsequently unfeather the propeller 40 while the propeller 40 is being driven by the eMotor 24. During this process, the eMotor control system 30 controls the eMotor 24 and thereby governs the propeller 40 speed to remain at the target rotational speed; e.g., an "underspeed NP reference" value. It should be noted that the degree to which the propeller is unfeathered is typically a function of the power lever angle (PLA); e.g., at a PLA ground idle setting, the propeller pitch may be at "flat" pitch or "zero pitch"; i.e., propeller pitch angle that is about zero degrees. The present disclosure HEP system 20 may be configured to coordinate the control of the eMotor and the degree of feathering with the PLA to achieve the functionality described herein. Once the propeller 40 is unfeathered and the propeller 40 is driven at the target propeller rotational speed (NP) by the eMotor 24, the present disclosure HEP system 30 starts the thermal engine 22. As the thermal engine 22 begins to run, the rotational drive produced by the thermal engine 22 (in direct drive configuration with the propeller 40) may cause the propeller speed (NP) to increase. During this process, the present disclosure HEP system 20 subsequently transitions the propeller 40 drive load from the eMotor 24 to the thermal engine 22 (e.g., decreasing the drive contribution of the eMotor 24 and increasing the drive contribution of the thermal engine 22) while controlling the propeller speed (NP) to remain at the target propeller rotational speed. Hence, this start sequence embodiment of the present disclosure respects the propeller speed and torque limits while the propeller 40 is feathered and the thermal engine 22 is transitioning to idle speed. This aspect of the present disclosure avoids an operational scenario where the thermal engine 22 is solely responsible for powering the propeller 40 at thermal engine 22 speeds below those necessary to maintain thermal engine accessories (e.g., electrical AC generator, hydraulic systems, and the like) online.

As stated herein, the eMotor control system 30 may be configured to control operation of the eMotor 24 (e.g., via stored instructions). In some embodiments, the eMotor control system 30 may control the eMotor 24 (e.g., control the rate of change of the eMotor 24 speed) so that the rate of unfeathering of the propeller 40 is controlled as a function of torque and/or rate of change of torque applied by the eMotor 24 to the propeller 40.

Figure 8:
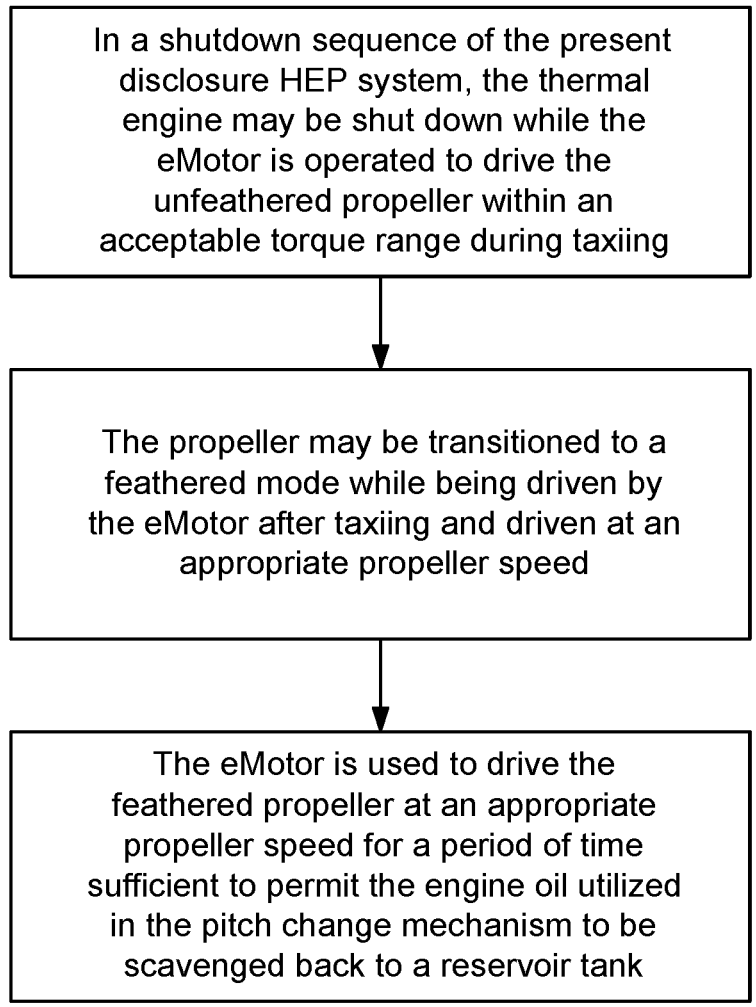
FIG. 8 is a flow chart of an embodiment of a present disclosure system operation.

Referring to FIG. 8, in some present disclosure embodiments, the present disclosure HEP system 20 may also be configured to improve the operability of the HEP system 20 during ground operations (e.g., subsequent to landing) and during a shutdown sequence. During taxiing after aircraft landing, the thermal engine 22 may be used at least initially to power the propeller 40 for propulsive purposes; e.g., during taxiing and the like. In this state, the propeller 40 will be controlled in an unfeathered state to provide propulsive power and to maintain the propeller 40 at a desirable propeller speed. In some present disclosure embodiments, the system 20 may be configured to transitionally change the source of the propulsive power drive from the thermal engine 22 to the eMotor 24 to accomplish aircraft movement as required. The aforesaid transition includes transitioning the thermal engine 22 from contributing some amount of the propulsive power drive to the propulsion unit 28 to not contributing any of the propulsive power drive to the propulsion unit 28, and transitioning the eMotor 24 from contributing some or no amount of the propulsive power drive to the propulsion unit 28 to contributing all the propulsive power drive to the propulsion unit 28. Once the system 20 is configured such that the thermal engine 22 is not contributing drive to the propulsion unit 28, operation of the thermal engine 22 may be terminated. In other embodiments, the HEP system 20 may be configured so that the thermal engine 22 powers the propeller 40 for propulsive purposes (e.g., during taxiing and the like) until the aircraft 18 is stationary, the drive power is transitioned from the thermal engine 22 to the eMotor 24, and the thermal engine 22 is shut down. The propeller blades 40A may then be fully feathered while being driven by the eMotor 24. The shutdown sequence may include using the eMotor 24 to drive the propeller 40 and thermal engine accessories (e.g., the engine oil system) for a period of time sufficient to permit the engine oil utilized in the pitch change mechanism 56 and other systems (e.g., the gearbox) to be scavenged from the propulsion unit 28; e.g., back to a reservoir tank or the like.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements. It is further noted that various method or process steps for embodiments of the present disclosure are described herein. The description may present method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

The invention claimed is:

1. A method of operating a hybrid electric propulsion system for an aircraft in a start sequence, the hybrid electric propulsion system including a thermal engine, an electric motor, a gearbox in communication with the thermal engine and the electric motor, an electric power storage unit, a propulsion unit having a propeller having propeller blades, and a controller in communication with the thermal engine, the electric motor, the propulsion unit, and a memory storing instructions, said instructions when executed cause the controller to perform a method during a start sequence of the hybrid electric propulsion system, the method comprising:
controlling the electric motor to drive the propeller from a static state to a target rotational speed within a predetermined range of speeds;
controlling the propulsion unit to transition the propeller blades from a feathered mode to an unfeathered mode while the propeller is being driven at the target rotational speed solely by the electric motor;
starting the thermal engine; and
controlling the electric motor and the thermal engine to transition the driving of the propeller using the electric motor to driving the propeller using the thermal engine.

2. The method of claim 1, wherein the transitioning the driving of the propeller to driving the propeller using the thermal engine includes terminating using the electric motor and solely using the thermal engine to drive the propeller.

3. The method of claim 1, wherein during the transitioning the driving of the propeller using the electric motor to driving the propeller using the thermal engine, a first drive contribution of the electric motor is decreased and a second drive contribution of the thermal engine is increased.

4. The method of claim 3, wherein during the transitioning the driving of the propeller, the first drive contribution of the electric motor is decreased to a zero contribution and the second drive contribution of the thermal engine is increased to the thermal engine solely driving the propeller.

5. The method of claim 1, wherein the propulsion unit includes a hydromechanical pitch change mechanism.

6. The method of claim 5, wherein during the driving of the propeller at the target rotational speed using the electric motor, the system is configured so that the electric motor drives an engine oil system of the thermal engine to produce a flow of engine oil adequate for the hydromechanical pitch change mechanism to control a pitch of the propeller blades.

7. The method of claim 1, wherein the electric motor is powered using electrical power from the electric power storage unit.

8. The method of claim 1, wherein the electric motor is powered using an external electric power source.

9. The method of claim 1, further comprising controlling the electric motor to control a rate of unfeathering of the propeller, including controlling the electric motor as a function of a torque and/or a rate of change of torque applied by the electric motor to the propeller.

10. A hybrid electric propulsion system for an aircraft, comprising:
a thermal engine;
an electric motor;
a gearbox in communication with the thermal engine and the electric motor;
an electric power storage unit;
a propulsion unit including a propeller having propeller blades; and
a controller in communication with the thermal engine, the electric motor, the propulsion unit, and a memory storing instructions, said instructions when executed cause the controller to perform a plurality of actions during a start sequence of the hybrid electric propulsion system, the plurality of actions including:
control the electric motor to drive the propeller from a static state to a target rotational speed within a predetermined range of speeds;
control the propulsion unit to transition the propeller blades from a feathered mode to an unfeathered mode while the propeller is being driven at the target rotational speed solely by the electric motor;
control the thermal engine to start operation; and
control the electric motor and the thermal engine to transition the driving of the propeller using the electric motor to driving the propeller using the thermal engine.

11. The system of claim 10, wherein the instructions when executed cause the controller to decrease a first drive contribution of the electric motor to a zero contribution and increase a second drive contribution of the thermal engine until the thermal engine is solely driving the propeller.

12. The system of claim 10, wherein the propulsion unit includes a hydromechanical pitch change mechanism.

13. The system of claim 12, wherein when the electric motor is controlled to drive the propeller from the static state to the target rotational speed using the electric motor, the system is configured so that the electric motor drives an engine oil system of the thermal engine to produce a flow of engine oil adequate for the hydromechanical pitch change mechanism to control a pitch of the propeller blades.

14. The system of claim 10, wherein the electric motor is powered using electrical power from the electric power storage unit during the start sequence.

15. The system of claim 10, wherein the electric motor is powered using an external electric power source during the start sequence.

16. The system of claim 10, wherein the instructions when executed cause the controller to control the electric motor to control a rate of unfeathering of the propeller, including controlling the electric motor as a function of a torque and/or a rate of change of torque applied by the electric motor to the propeller.

* * * * *